US011436799B2

(12) United States Patent
Tanaka et al.

(10) Patent No.: US 11,436,799 B2
(45) Date of Patent: Sep. 6, 2022

(54) INFORMATION PROCESSING APPARATUS AND NON-TRANSITORY COMPUTER READABLE MEDIUM

(71) Applicant: FUJIFILM BUSINESS INNOVATION CORP., Tokyo (JP)

(72) Inventors: Yasuyuki Tanaka, Kanagawa (JP); Yuki Yokoyama, Kanagawa (JP); Ryosuke Higashikata, Kanagawa (JP); Tomonari Takahashi, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 67 days.

(21) Appl. No.: 16/983,207

(22) Filed: Aug. 3, 2020

(65) Prior Publication Data
US 2021/0241525 A1 Aug. 5, 2021

(30) Foreign Application Priority Data
Jan. 31, 2020 (JP) .............................. JP2020-015795

(51) Int. Cl.
*G06T 15/00* (2011.01)
*G06T 17/20* (2006.01)
*G01B 11/24* (2006.01)
*B29C 64/386* (2017.01)
*B33Y 50/00* (2015.01)
*B22F 10/00* (2021.01)
*B22F 10/10* (2021.01)

(52) U.S. Cl.
CPC ............ *G06T 17/20* (2013.01); *B29C 64/386* (2017.08); *B33Y 50/00* (2014.12); *G01B 11/24* (2013.01); *B22F 10/00* (2021.01); *B22F 10/10* (2021.01)

(58) Field of Classification Search
CPC .......... G01B 11/24; B22F 10/00; B22F 10/10; G06T 17/20; B33Y 50/00; B29C 64/386
USPC ......................................................... 345/418
See application file for complete search history.

(56) References Cited

U.S. PATENT DOCUMENTS

| | | | | |
|---|---|---|---|---|
| 7,826,646 | B2 * | 11/2010 | Pavlovskaia | A61C 7/002 382/128 |
| 9,117,267 | B2 * | 8/2015 | Francis, Jr. | G06T 7/521 |
| 9,305,391 | B2 * | 4/2016 | Tipton | G06T 17/00 |
| 11,138,791 | B2 * | 10/2021 | Cantor | G06T 17/20 |
| 11,328,481 | B2 * | 5/2022 | Meilland | G06T 3/4007 |
| 2016/0267705 | A1 * | 9/2016 | O'Leary | G06T 13/20 |
| 2019/0197786 | A1 * | 6/2019 | Molyneaux | G06T 7/593 |
| 2021/0046545 | A1 * | 2/2021 | Yokoyama | B33Y 50/00 |

(Continued)

OTHER PUBLICATIONS

Brown, Justin, A Computational Method for Voxel to Polygon Mesh Conversion of Anatomic Computational Human Phantoms and Aircrew Doses From Cosmic Ray Sources; University of Florida, 2017.*

(Continued)

*Primary Examiner* — Phu K Nguyen
(74) *Attorney, Agent, or Firm* — Oliff PLC

(57) ABSTRACT

An information processing apparatus includes a processor configured to acquire voxel data and polygon mesh data, the voxel data representing a three-dimensional body by using multiple voxels, each of the multiple voxels retaining an attribute, the polygon mesh data representing the three-dimensional body by using multiple polygons, and output the polygon mesh data after assigning attributes retained by the multiple voxels to the multiple polygons.

20 Claims, 12 Drawing Sheets

(56) References Cited

U.S. PATENT DOCUMENTS

2022/0051094 A1* 2/2022 Chentanez ............ G06T 17/205

OTHER PUBLICATIONS

Si, Hang. "TetGen, a Quality Tetrahedral Mesh Generator." AMC Transactions on Mathematical Software 41 (2015).2: 11.*
Furuta, Takuya, Sato, Tatsuhiko, Han, Min Cheol, Yeom, Yeon Soo, Kim, Chan Hyeong, Brown, Justin L, and Bolch, Wesley E. "Implementation of tetrahedral-mesh geometry in Monte Carlo radiation transport code PHITS." Physics in Medicine and Biology 62 (2017). 12: 4798-4810.*
Smile Sikand, Voxel to Mesh Conversion: Marching Cube Algorithm, Jul. 19, 2017, pp. 1-9.*
Brown J.L., Furuta T., Bolch W.E. (2019) A Robust Algorithm for Voxel-to-Polygon Mesh Phantom Conversion. In: Makarov S., Horner M., Noetscher G. (eds) Brain and Human Body Modeling. Springer, Cham, https://doi.org/10.1007/978-3-030-21293-3_17.*
Makarov, Sergey, Marc Horner, and Gregory Noetscher. "Brain and human body modeling: computational human modeling at EMBC 2018." (2019): 402.*
Frey P, Sarter B, Gautherie M. Fully automatic mesh generation for 3-D domains based upon voxel sets. International Journal for Numerical Methods in Engineering. Aug. 30, 1994;37(16):2735-53.*
Makarov et al., "Brain and Human Body Modeling" Computational Human Modeling at EMBC 2018, pp. 2-399.

* cited by examiner

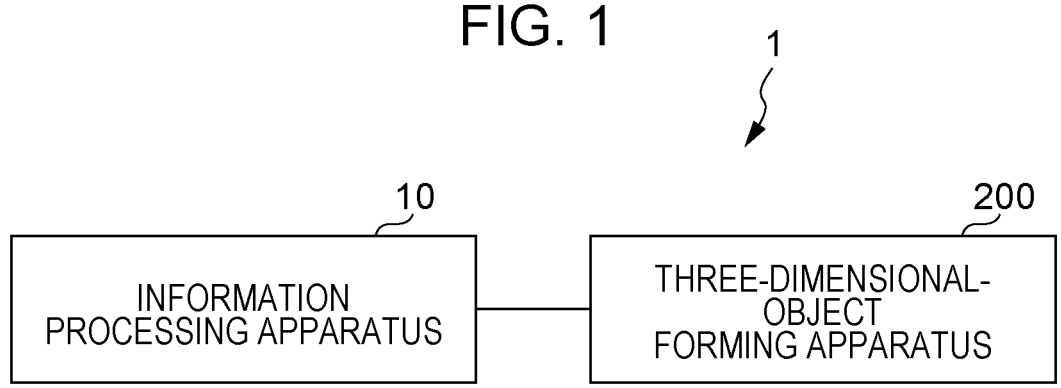
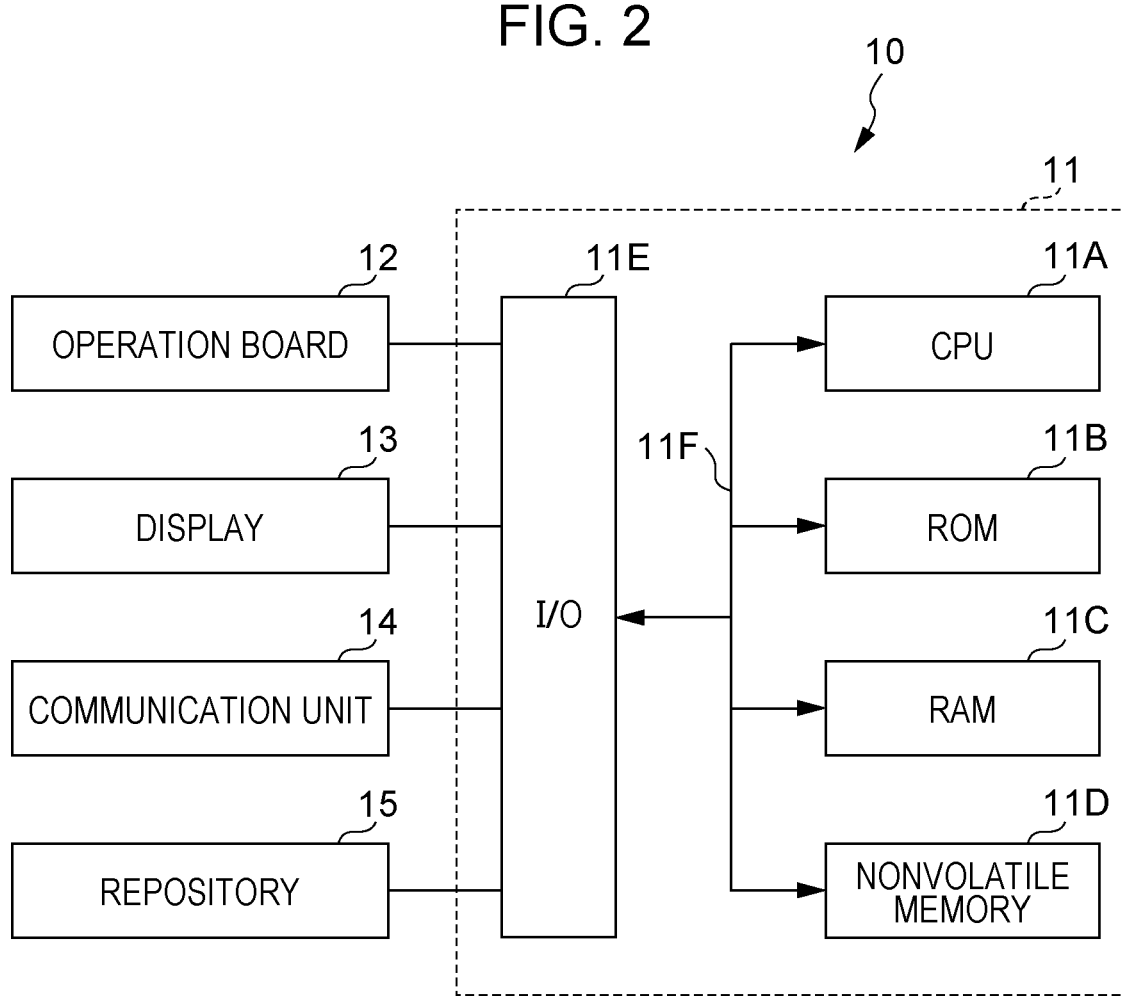

FIG. 9A — 56

| VOXEL ID | VOXEL ATTRIBUTE SET | |
|---|---|---|
| | A | |
| | B | |
| | ... | |

FIG. 9B — 57

| VOXEL ID | VOXEL COORDINATES | |
|---|---|---|
| | x | |
| | y | |
| | z | |

FIG. 9C — 58

| POLYGON ID | VERTEX ID | VERTEX COORDINATES | VOXEL ID |
|---|---|---|---|
| | | x | |
| | | y | |
| | | z | |

FIG. 9D — 59

| POLYGON ID | VERTEX ID | VERTEX COORDINATES | VOXEL ID | VOXEL COORDINATES | POLYGON ATTRIBUTE SET |
|---|---|---|---|---|---|
| | | x | | x | A |
| | | y | | y | B |
| | | z | | z | ... |

INFORMATION PROCESSING APPARATUS AND NON-TRANSITORY COMPUTER READABLE MEDIUM

CROSS-REFERENCE TO RELATED APPLICATIONS

This application is based on and claims priority under 35 USC 119 from Japanese Patent Application No. 2020-015795 filed Jan. 31, 2020.

BACKGROUND

(i) Technical Field

The present disclosure relates to an information processing apparatus and a non-transitory computer readable medium storing a program.

(ii) Related Art

Techniques to convert voxel data into polygon mesh data are disclosed in Brain and Human Body Modeling (Computational Human Modeling at EMBC 2018); Sergey Makarov, Marc Horner, Gregory Noetscher, Eds.; Springer Nature: Switzerland, 2019.

SUMMARY

In recent years, three-dimensional measurement techniques by using such instruments as a magnetic resonance imaging (MRI) scanner and a laser scanner are actively being developed and used in various fields. Voxel data that represents a three-dimensional body captured by using such instruments as an MRI scanner and a laser scanner is used to reproduce the three-dimensional body faithfully. In such a case, the three-dimensional body is displayed by a monitor or formed by using a three-dimensional-object forming apparatus, and the voxel data is sometimes converted into polygon mesh data.

However, when voxel data and polygon mesh data are associated with each other, one or more attributes (for example, color information) retained by voxels that form the voxel data are not necessarily transferred to the polygon mesh data.

Aspects of non-limiting embodiments of the present disclosure relate to providing an information processing apparatus and a non-transitory computer readable medium, which stores an information processing program, that can transfer one or more attributes retained by voxels in voxel data to polygon mesh data when the voxel data and the polygon mesh data are associated with each other.

Aspects of certain non-limiting embodiments of the present disclosure overcome the above disadvantages and/or other disadvantages not described above. However, aspects of the non-limiting embodiments are not required to overcome the disadvantages described above, and aspects of the non-limiting embodiments of the present disclosure may not overcome any of the disadvantages described above.

According to an aspect of the present disclosure, there is provided an information processing apparatus including a processor configured to acquire voxel data and polygon mesh data, the voxel data representing a three-dimensional body by using a plurality of voxels, each of the plurality of voxels retaining an attribute, the polygon mesh data representing the three-dimensional body by using a plurality of polygons, and output the polygon mesh data after assigning attributes retained by the plurality of voxels to the plurality of polygons.

BRIEF DESCRIPTION OF THE DRAWINGS

Exemplary embodiments of the present disclosure will be described in detail based on the following figures, wherein:

FIG. 1 is a block diagram depicting an example of a three-dimensional-object forming system according to each of the present exemplary embodiments;

FIG. 2 is a block diagram depicting an example of an information processing apparatus according to each of the present exemplary embodiments;

FIGS. 9A to 9D are illustrations depicting examples of attribute information, coordinate information, polygon information, and polygon mesh data according to each of the present exemplary embodiments;

DETAILED DESCRIPTION

First Exemplary Embodiment

Figure 3:
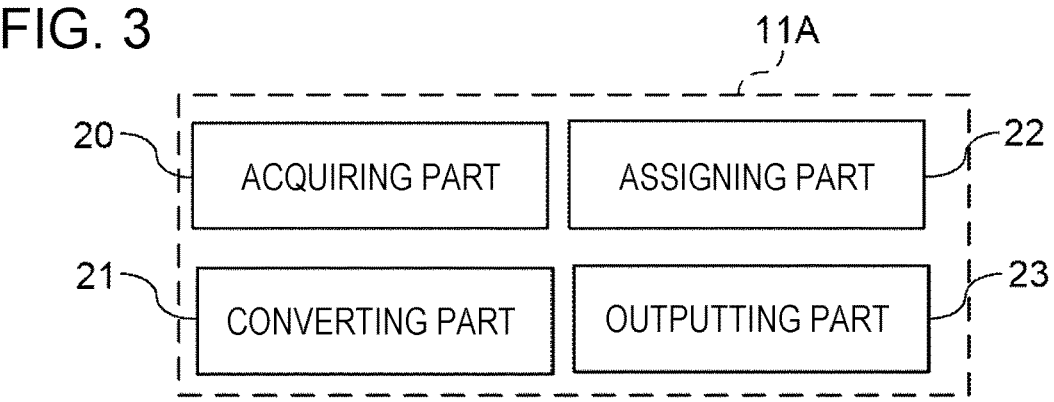
FIG. 3 is a block diagram depicting an example of a functional configuration of the information processing apparatus according to each of the present exemplary embodiments.

Hereinafter, exemplary embodiments for practicing the present disclosure will be described in detail with reference to the drawings.

FIG. 1 is a block diagram of a three-dimensional-object forming system 1 according to the present exemplary embodiment. As depicted in FIG. 1, the three-dimensionalobject forming system 1 includes an information processing apparatus 10 and a three-dimensional-object forming apparatus 200.

Next, a configuration of the information processing apparatus 10 according to the present exemplary embodiment will be described with reference to FIG. 2.

For example, a personal computer or the like constitutes the information processing apparatus 10, which includes a controller 11. The controller 11 includes a central processing unit (CPU) 11A, a read-only memory (ROM) 11B, a random-access memory (RAM) 11C, a nonvolatile memory 11D, and an input/output interface (I/O) 11E. The CPU 11A, the ROM 11B, the RAM 11C, the nonvolatile memory 11D, and the I/O 11E are connected to each other by using a bus 11F. The CPU 11A is an example of a processor.

In addition, an operation board 12, a display 13, a communication unit 14, and a repository 15 are connected to the I/O 11E.

The operation board 12 includes, for example, a mouse and a keyboard.

The display 13 is constituted, for example, by a liquid crystal display or the like.

The communication unit 14 is an interface to perform data communication with external apparatuses, such as the three-dimensional-object forming apparatus 200.

The repository 15 is constituted by a nonvolatile memory device such as a hard disk and stores an information processing program, three-dimensional-shape data, and the like, which will be described below. The CPU 11A loads and executes the information processing program stored in the repository 15. In the description of the present exemplary embodiment, three-dimensional-shape data is assumed to be voxel data or polygon mesh data.

Next, a functional configuration of the CPU 11A will be described.

As depicted in FIG. 3, the CPU 11A includes an acquiring part 20, a converting part 21, an assigning part 22, and an outputting part 23 as functional parts.

The acquiring part 20 acquires voxel data representing a three-dimensional body by using a plurality of voxels, each of which retains an attribute.

The converting part 21 converts voxel data into polygon mesh data by using a predetermined method. The predetermined method is a method to convert voxel data into polygon mesh data. Polygon mesh data combines a plurality of polygons, such as triangles, and represents a three-dimensional body by using a mesh. In the present exemplary embodiment, a case of using the marching cubes method as the predetermined method will be described by way of non-limiting example. In the marching cubes method, a predetermined surface is set based on determination of whether each of 8 (=2×2×2) adjacent voxels is inside or outside a three-dimensional object, and voxel data is converted into polygon mesh data.

A voxel is a basic constituent of a three-dimensional body and is to be represented by a cuboid, which has a certain volume, but a voxel according to the present exemplary embodiment is represented by a point to avoid complexity.

The assigning part 22 associates voxels in voxel data with polygons in a polygon mesh and assigns an attribute retained by a voxel to a polygon.

Figure 4A:
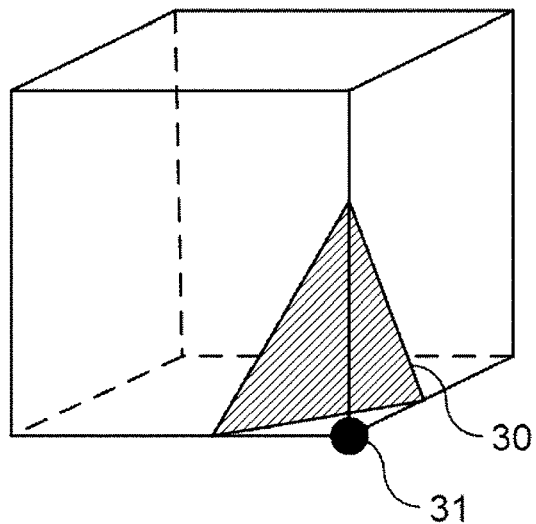
FIGS. 4A and 4B are schematic illustrations each depicting an example of a polygon used to describe attribute assignment according to each of the present exemplary embodiments.

For example, as depicted in FIG. 4A, if voxel data is converted into polygon mesh data and at least one voxel associated with a polygon 30 is determined to be a voxel 31, the assigning part 22 assigns an attribute retained by the voxel 31 to the polygon 30.

Figure 4B:
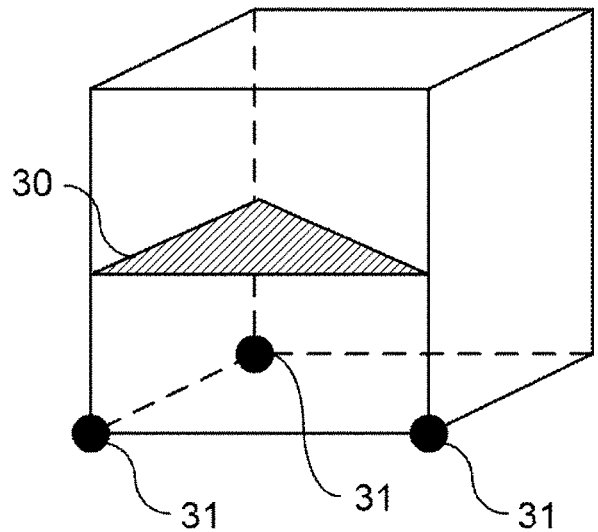

Further, as depicted in FIG. 4B, if a plurality of voxels 31 are associated with a polygon 30, the assigning part 22 derives an attribute in accordance with attributes retained by the plurality of voxels 31 and a distance from each of the plurality of voxels 31 to the polygon 30 and assigns the derived attribute to the polygon 30.

Specifically, the assigning part 22 derives the attribute from the attributes and the distances by using a logical AND operation, a logical OR operation, or statistics. If the attributes retained by the voxels 31 are in binary format (for example, black and white, presence or absence, data represented by a binary number, or the like), the assigning part 22 derives the attribute from the attributes retained by the plurality of voxels by using a logical AND operation or a logical OR operation. If the attributes retained by the voxels 31 are a continuous value, such as an intensity, the average is used to derive a value of an attribute and assigns the derived value to the polygon 30. If the attributes retained by the voxels 31 are a continuous value, such as temperature, which is associated with a distance, the weighted average is used to derive a value of an attribute and assigns the derived value to the polygon 30.

In the present exemplary embodiment, a case where an attribute is derived by using statistics based on the average or the weighted average has been described by way of non-limiting example. An attribute may be derived by using statistics based on the median value, the average, the maximum, or the minimum.

In addition, the assigning part 22 may assign an attribute in accordance with a distance. For example, the assigning part 22 may derive a distance from each of the voxels 31 to the polygon 30 and may assign to the polygon 30 the attribute retained by the nearest of the voxels 31.

Figure 5:
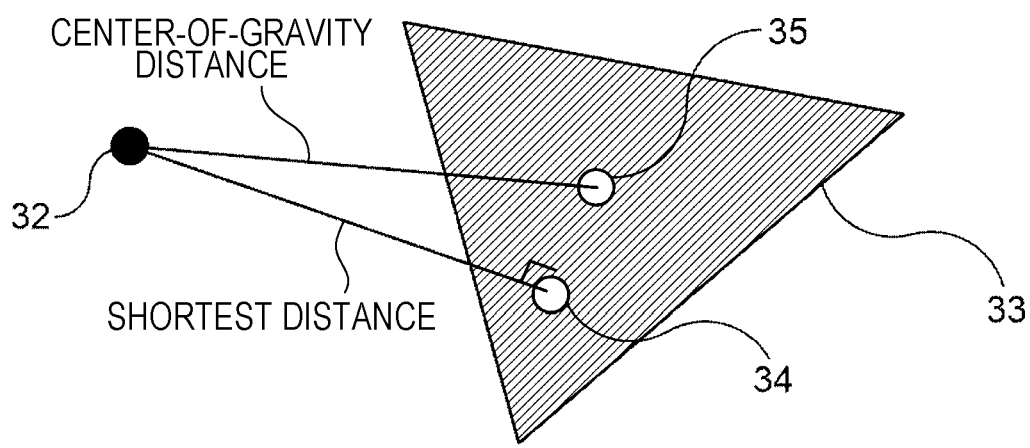
FIG. 5 is an illustration depicting an example of a polygon used to describe a distance between a voxel and the polygon according to each of the present exemplary embodiments.

The distance in this example indicates the shortest distance from the center of gravity 32 of the voxel to the nearest point 34 in a polygon 33 as depicted in FIG. 5. As depicted in FIG. 5, the shortest distance indicates a distance from the center of gravity 32 of the voxel to the nearest point 34, which is the foot of the line that is perpendicular to the plane including the polygon 33 and that passes through the center of gravity 32 of the voxel. The shortest distance is the shortest of the distances from the center of gravity 32 of the voxel to the points on the polygon 33. In the description of the present exemplary embodiment, the distance is assumed to be the shortest distance by way of non-limiting example. As depicted in FIG. 5, the distance may be the center-of-gravity distance, which is the distance from the center of gravity 32 of the voxel to the center of gravity 35 of the polygon 33 or may be a signed distance field (SDF), which manages a distance value having a sign. In SDF, which is a known technique to represent relative positions in a three-dimensional object, the signed distance field of a voxel is set to a distance from a predetermined point, such as the center of gravity of the voxel, to the nearest polygon. In such a case, the CPU 11A attaches a plus sign to a calculated distance if the predetermined point, which is the reference point to measure a distance, is located inside the three-dimensional body, and a minus sign to a calculated distance if the predetermined point is not located inside the three-dimensional body.

In the description of the present exemplary embodiment, the center of gravity of a voxel 31 is assumed to be the reference point for a distance by way of non-limiting example. Instead of the coordinates of the center of gravity of the voxel 31, if the coordinates of the reference point or the like of each voxel are specified in advance as one of the attributes, a distance may be calculated based on such a reference point. For example, if a three-dimensional body is formed by using the three-dimensional-object forming apparatus 200 and each voxel retains as an attribute a parameter such as the difference between the coordinates of the geometrical center of the voxel and the coordinates of the center of gravity of a region corresponding to the voxel in the three-dimensional body, the coordinates of the center of gravity of each voxel corresponding to the three-dimensional body may be obtained from such a difference to calculate a distance.

In FIG. 3, the outputting part 23 outputs polygon mesh data to which attributes are assigned. For example, the outputting part 23 may store the polygon mesh data to which attributes are assigned in the repository 15. Alternatively, the outputting part 23 may accept the specification of an attribute and display on the display 13 the polygon mesh data having polygons colored differently based on the value of the specified attribute.

Figure 6:
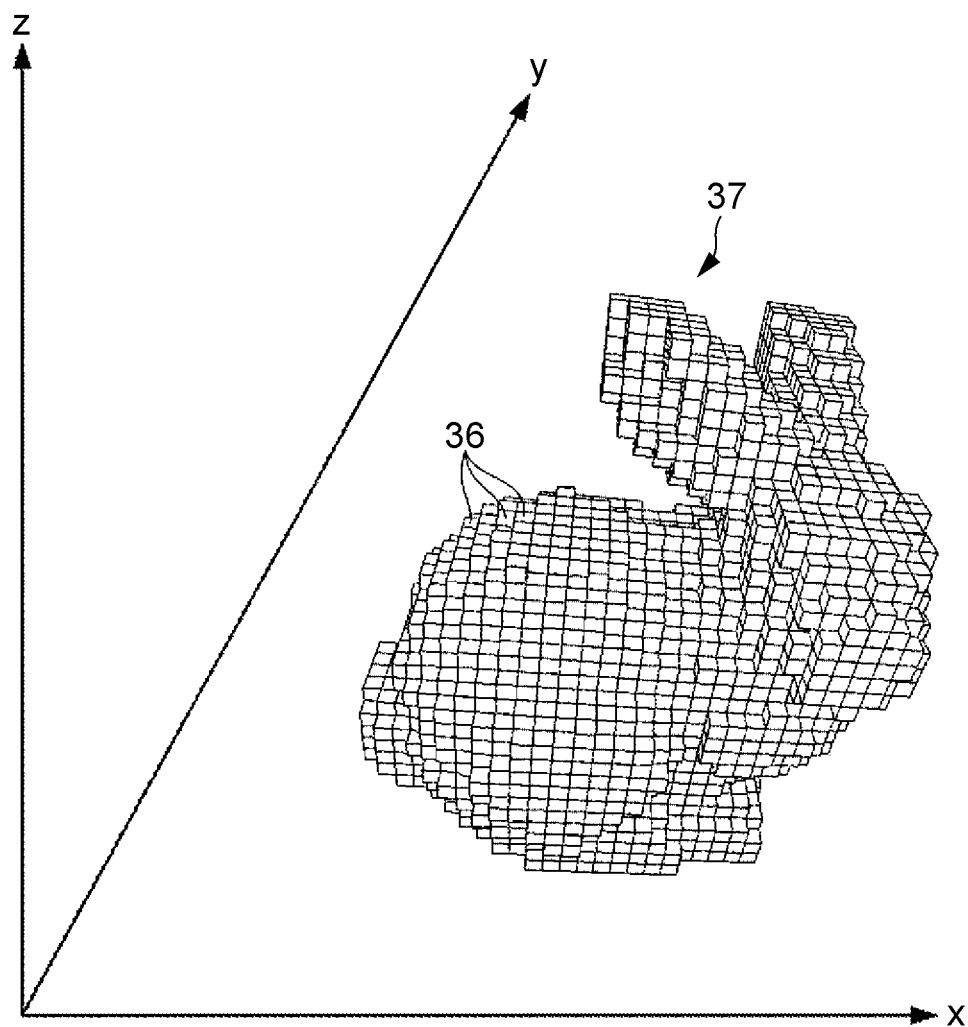
FIG. 6 is an illustration depicting an example of a three-dimensional body represented by using voxels according to each of the present exemplary embodiments.

Next, referring to FIG. 6, a three-dimensional body 37 represented by voxels 36 will be described. FIG. 6 is an illustration depicting an example of the three-dimensional body 37 represented by using voxels 36 according to the present exemplary embodiment.

As depicted in FIG. 6, the three-dimensional body 37 is formed by using a plurality of voxels 36. A voxel 36 is a basic constituent of the three-dimensional body 37 and has, for example, a cuboid shape. The shape is not limited to a cuboid and may be a sphere, a solid cylinder, or the like. Voxels 36 are piled up to represent a desired three-dimensional body, which is the three-dimensional body 37.

A three-dimensional-object forming method, such as the fused deposition modeling (FDM) method or the selective laser sintering (SLS) method, is adopted to form the three-dimensional body 37. In the FDM method, a thermoplastic resin is fused and layered to form the three-dimensional body 37, and in the SLS method, a metal material in powder form is irradiated with a laser beam and sintered to form the three-dimensional body 37. Three-dimensional-object forming methods other than these two may be adopted. In the present exemplary embodiment, a description will be given of a case where the three-dimensional body 37 is formed by using the selective laser sintering method.

Figure 7:
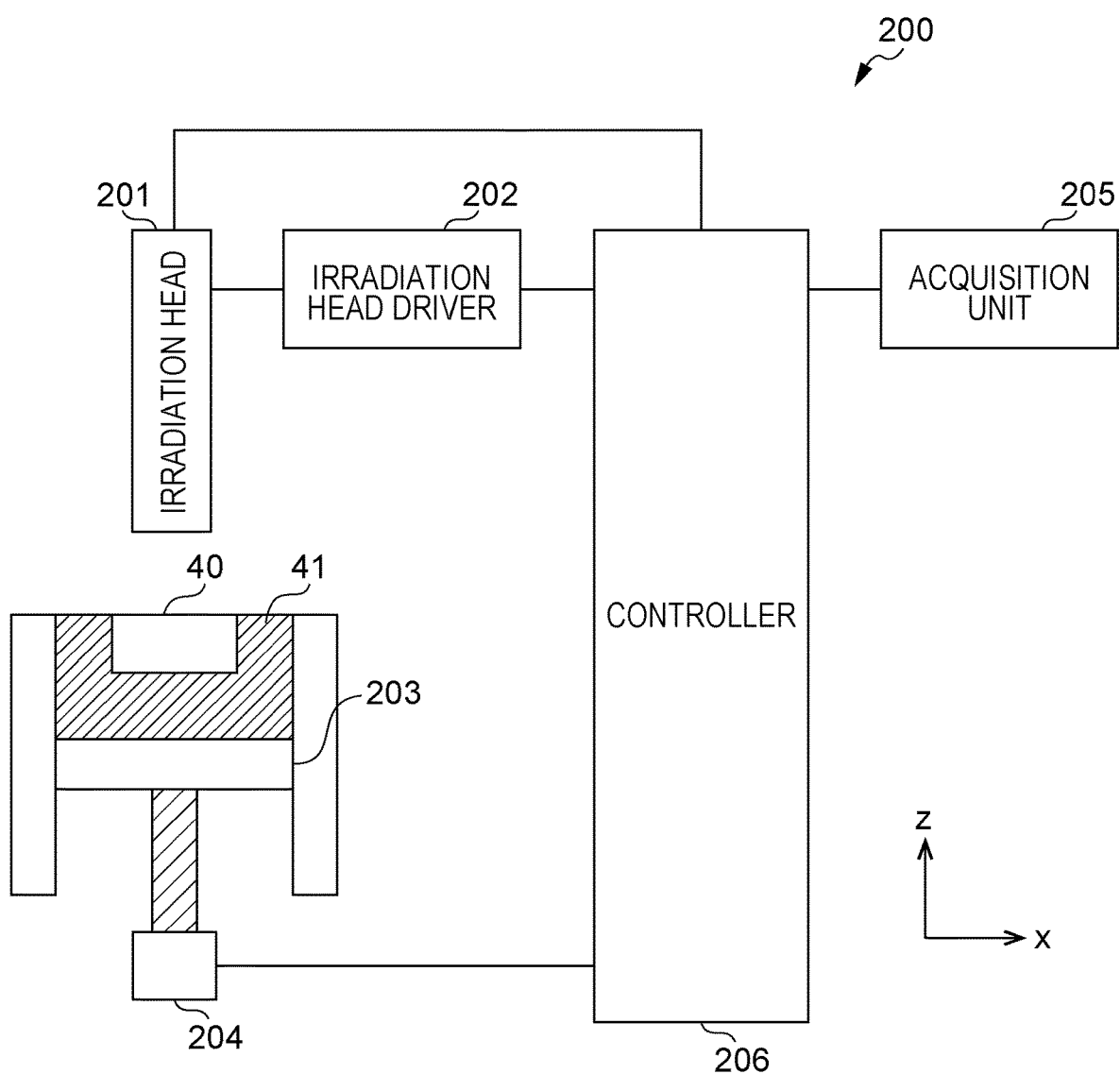
FIG. 7 is a block diagram depicting an example of a three-dimensional-object forming apparatus according to each of the present exemplary embodiments.

Next, a description will be given of the three-dimensional-object forming apparatus 200 to form a three-dimensional body 40 by using three-dimensional-shape data created by the information processing apparatus 10. FIG. 7 is an example of a configuration of the three-dimensional-object forming apparatus 200 according to the present exemplary embodiment. The three-dimensional-object forming apparatus 200 forms a three-dimensional body 40 by using the selective laser sintering method.

As depicted in FIG. 7, the three-dimensional-object forming apparatus 200 includes an irradiation head 201, an irradiation head driver 202, a forming pedestal 203, a forming pedestal driver 204, an acquisition unit 205, and a controller 206. The irradiation head 201, the irradiation head driver 202, the forming pedestal 203, and the forming pedestal driver 204 are an example of a forming part.

The irradiation head 201 is a laser irradiation head that irradiates a forming material 41 with laser light to form the three-dimensional body 40.

The irradiation head 201 is driven by the irradiation head driver 202, and the xy-plane is two-dimensionally scanned with laser light.

The forming pedestal 203 is driven by the forming pedestal driver 204 and moved up and down in the z-axis direction.

The acquisition unit 205 acquires three-dimensional-shape data created by the information processing apparatus 10.

In accordance with the three-dimensional-shape data acquired by the acquisition unit 205, the controller 206 causes the irradiation head 201 to irradiate with laser light the forming material 41 placed on the forming pedestal 203 and causes the irradiation head driver 202 to control the position to be irradiated with laser light.

Whenever one layer has been formed, the controller 206 causes the forming pedestal driver 204 to lower the forming pedestal 203 by a predetermined layering spacing and injects the forming material 41 onto the forming pedestal 203. In this way, the three-dimensional body 40 based on the three-dimensional-shape data is formed.

Next, a method to assign an attribute to a polygon in the present exemplary embodiment will be described with reference to FIG. 8, FIGS. 9A to 9D, and FIGS. 10A and 10B, followed by a description of an operation of the information processing apparatus 10 according to the present exemplary embodiment.

Figure 8:
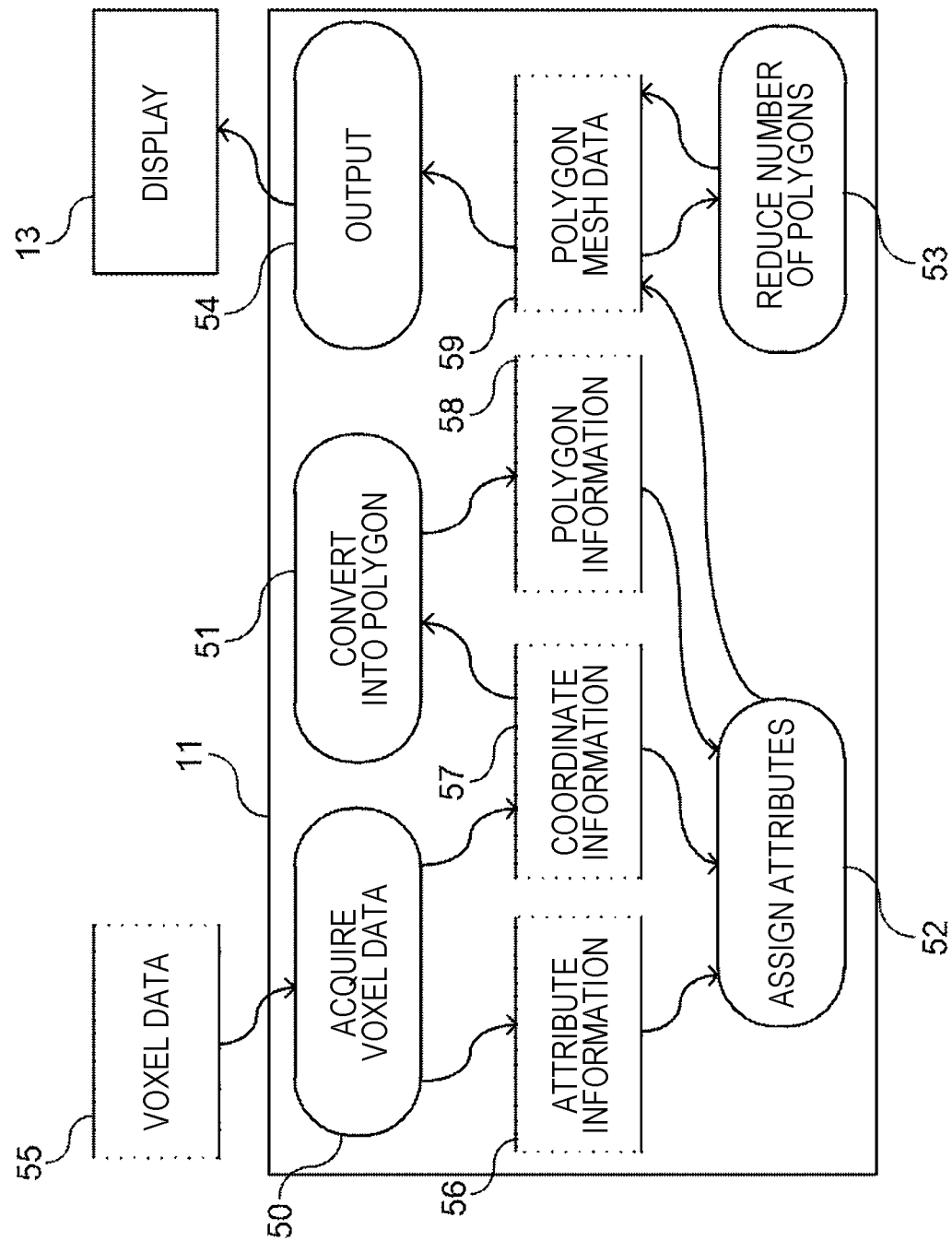
FIG. 8 is a data flow diagram depicting an example of information processing according to a first exemplary embodiment.

FIG. 8 is a data flow diagram depicting an example of information processing according to the present exemplary embodiment. As depicted in FIG. 8, the CPU 11A of the information processing apparatus 10 performs a process of acquiring voxel data 50, a process of converting into polygon 51, a process of assigning attributes 52, a process of reducing the number of polygons 53, and an output process 54. The CPU 11A also creates attribute information 56, coordinate information 57, polygon information 58, and polygon mesh data 59.

As an example, as depicted in FIG. 9A, the attribute information 56 includes a voxel identification (ID) and a voxel attribute set. A voxel ID is a numeral-symbol combination uniquely assigned to each voxel, and a voxel attribute set is information regarding at least one attribute retained by each voxel. As depicted in FIG. 9B, the coordinate information 57 includes a voxel ID and voxel coordinates. Voxel coordinates indicate the position of a voxel.

As an example, as depicted in FIG. 9C, the polygon information 58 includes a polygon ID, a vertex ID, vertex coordinates, and at least one voxel ID. A polygon ID is a numeral-symbol combination uniquely assigned to each polygon (surface) that forms a polygon mesh, and a vertex ID is a numeral-symbol combination assigned to each vertex (apex) that forms a polygon. Vertex coordinates indicate the position of a vertex. The polygon information 58 includes one or more voxel IDs each indicating a voxel associated with a polygon. One or more voxel IDs are associated with each polygon.

As an example, as depicted in FIG. 9D, the polygon mesh data 59 includes a polygon ID, a vertex ID, vertex coordinates, a voxel ID, voxel coordinates, and a polygon attribute set. A polygon attribute set includes at least one attribute obtained from one or more voxels associated with a polygon and is assigned to each polygon. A polygon ID in the polygon mesh data 59 is associated with coordinates of vertexes forming the polygon and coordinates of at least one voxel associated with the polygon.

Referring to FIG. 8, in the process of acquiring voxel data 50, voxel data 55, which is input by a user, is acquired, and the attribute information 56 and the coordinate information 57 are generated from the voxel data 55. The attribute information 56 is retained by each voxel, and the coordinate information 57 indicates the coordinates of the voxel.

In the process of converting into polygon 51, voxels are converted into polygons by using the coordinate information 57, and the polygon information 58 is created.

In the process of assigning attributes 52, the polygon mesh data 59 is created by using the attribute information 56, the coordinate information 57, and the polygon information 58.

In the process of reducing the number of polygons 53, the number of polygons is reduced by using the polygon mesh data 59. Specifically, a first group of polygons sharing a vertex on one end of an edge is compared with a second group of polygons sharing a vertex on the other end of the same edge in the process of reducing the number of polygons 53. If the first group of polygons is assigned an attribute set that is equivalent to or regarded as equivalent to an attribute set assigned to the second group of polygons, the edge is contracted, and the vertexes on both ends of the edge are unified in this process. In the process of reducing the number of polygons 53, comparison between attribute sets of polygons and unification of vertexes by edge contraction are repeated until the number of polygons is reduced to a specified number of polygons.

Attribute sets are regarded as equivalent if the difference between an attribute set and a reference attribute set is within a predetermined range. The predetermined range may be specified by the user.

Figure 10A:
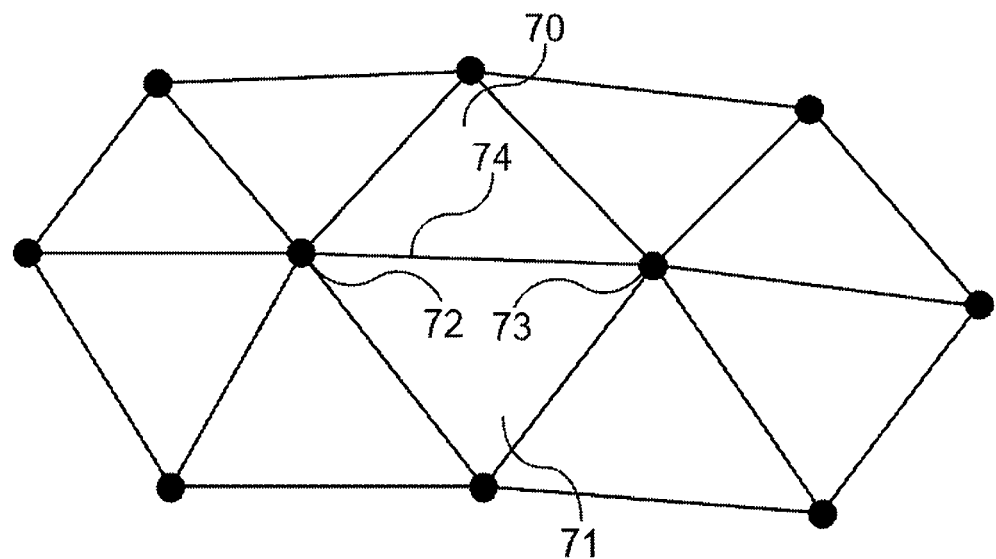
FIGS. 10A and 10B are schematic illustrations depicting an example of a mesh used to describe a reduction in the number of polygons according to each of the present exemplary embodiments.

For example, as depicted in FIG. 10A, if a vertex 72 and a vertex 73 share an edge 74 and ten triangular polygons in contact with the vertex 72 or the vertex 73 have attribute sets that are equivalent or regarded as equivalent, the vertex 72 and the vertex 73 located one each on opposite ends of the edge 74, which is shared by a polygon 70 and a polygon 71, are unified.

Figure 10B:
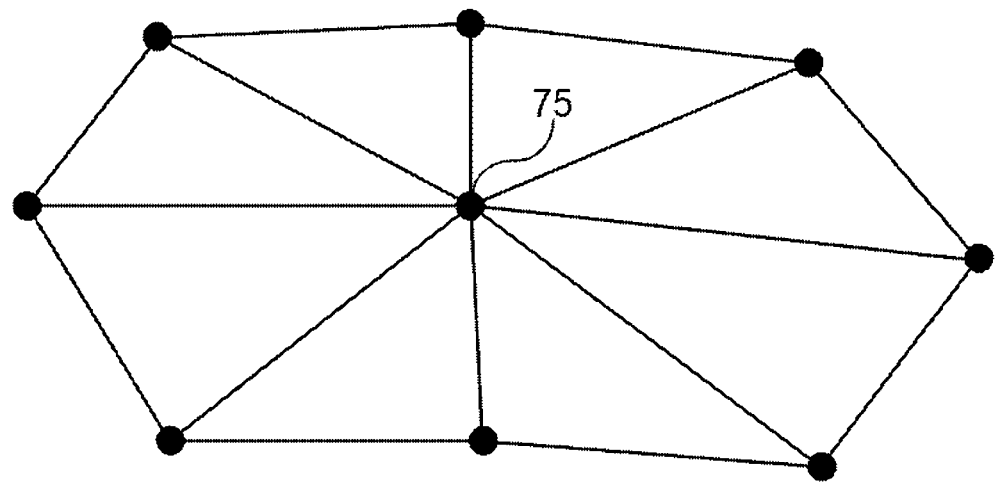

As depicted in FIG. 10B, if the vertex 72 and the vertex 73 are unified into a vertex 75, the polygon 70 and the polygon 71, which share the edge 74 to be contracted, disappear, and the number of polygons is reduced to 8. In this way, the number of polygons is reduced, and the amount of data is reduced.

However, when the number of polygons is reduced in FIG. 10A, attention needs to be paid to whether a polygon that shares a vertex to be unified is turned over after the vertex is unified. Attention also needs to be paid to a change in the shape of the three-dimensional body represented by the polygon mesh and to effects on attributes.

For example, in FIG. 10A, the polygons in contact with the vertex 72 or the vertex 73 change shape as a result of vertex unification. In addition, some of the polygons may be turned over, and the direction of a normal may be reversed. To prevent a normal from being reversed, a method may be adopted to check whether the normal of at least one of all the polygons in contact with the vertex 72 or the vertex 73 is reversed after the vertexes are unified and to determine that the vertexes be not unified if the normal of at least one polygon is reversed.

In addition, as a result of vertex unification, a three-dimensional shape, which is represented by a plurality of polygons affected by the vertex unification, typically changes. For example, in FIG. 10A, if all the vertexes are located on a single plane, the vertex 75 in FIG. 10B is placed on the same plane, and the three-dimensional shape does not change after the vertex unification. However, if only the vertex 72 and the vertex 73 are located at positions that are not on a plane on which other vertexes are located, the three-dimensional shape changes to some extent wherever the vertex 75 is positioned. Thus, a vertex after unification is set at the optimal position to minimize the change in shape due to the unification. Further, the magnitude of change in shape due to contraction is evaluated for each edge, and an edge for which the change in shape is small is prioritized for contraction. These operations constitute a method to be used to reduce the change in shape. Quadric error metrics (QEM) are typically used to presume the optimal position of the vertex after the unification and to estimate the magnitude of the change in shape.

Reducing the number of polygons in this way suppresses the change in shape of the surrounding polygons and the polygon mesh.

As depicted in FIG. 8, the polygon mesh data 59 is output in the output process 54. As an example, as depicted in FIG. 8, the polygon mesh data 59 is displayed on the display 13. In addition, the polygon mesh data 59 may be stored in the repository 15 or may be transmitted to the three-dimensional-object forming apparatus 200, which is externally located, via the communication unit 14.

Figure 11:
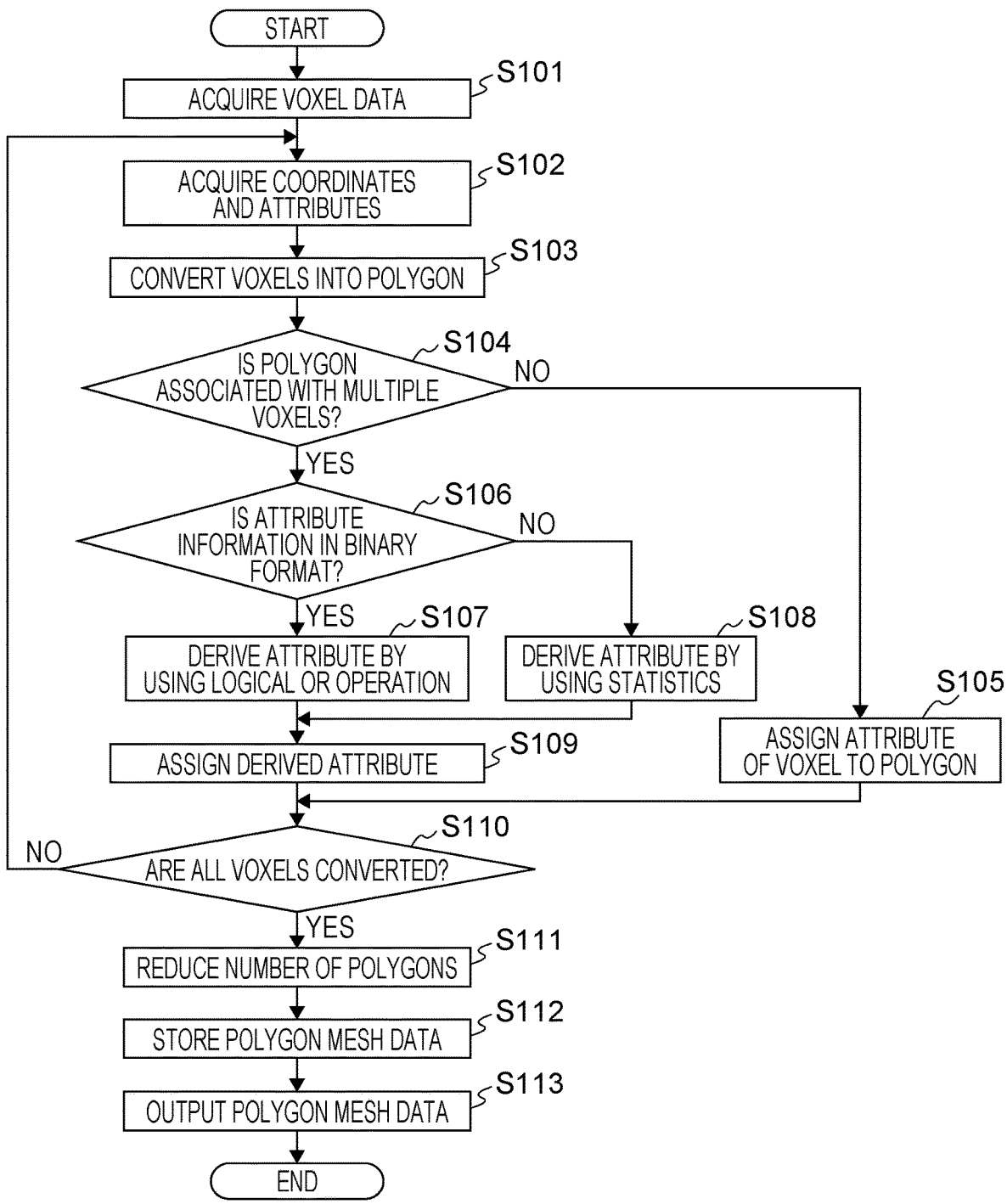
FIG. 11 is a flowchart depicting an example of information processing according to the first exemplary embodiment.

Next, referring to FIG. 11, an operation of an information processing program according to the present exemplary embodiment will be described. FIG. 11 is a flowchart depicting an example of information processing according to the present exemplary embodiment. The CPU 11A loads the information processing program from the ROM 11B or the nonvolatile memory 11D and executes the program, and the information processing depicted in FIG. 11 is performed. The information processing depicted in FIG. 11 is performed, for example, in response to an input from the user to execute the information processing program.

In step S101, the CPU 11A acquires voxel data.

In step S102, the CPU 11A acquires voxel coordinates and attributes from the voxel data.

In step S103, the CPU 11A converts voxels to a polygon by using the voxel coordinates.

In step S104, the CPU 11A determines whether the polygon obtained by conversion is associated with a plurality of voxels. If the polygon is associated with a plurality of voxels (YES in step S104), the CPU 11A makes the process proceed to step S106. In contrast, if the polygon is not associated with a plurality of voxels (NO in step S104), the CPU 11A makes the process proceed to step S105.

In step S105, the CPU 11A assigns the attribute of a voxel to the polygon.

In step S106, the CPU 11A determines whether an attribute retained by each of the plurality of voxels is in binary format. If the attribute is in binary format (YES in step S106) the CPU 11A makes the process proceed to step S107. In contrast, if the attribute is not in binary format (NO in step S106), the CPU 11A makes the process proceed to step S108.

In step S107, the CPU 11A derives an attribute to be assigned to the polygon from the attribute retained by each of the plurality of voxels by using a logical OR operation.

In step S108, the CPU 11A derives an attribute to be assigned to the polygon from the attribute retained by each of the plurality of voxels by using statistics.

In step S109, the CPU 11A assigns the derived attribute to the polygon.

In step S110, the CPU 11A determines whether all the voxels have been converted into polygons. If all the voxels have been converted (YES in step S110), the CPU 11A makes the process proceed to step S111. In contrast, if at least one voxel has not been converted (NO in step S110), the CPU 11A makes the process proceed to step S102.

In step S111, the CPU 11A unifies vertexes and reduces the number of polygons.

In step S112, the CPU 11A stores polygon mesh data having polygons into which voxels are converted.

In step S113, the CPU 11A outputs the polygon mesh data.

As described above, in the present exemplary embodiment, attributes retained by voxels in voxel data are transferred to polygon mesh data.

Second Exemplary Embodiment

In the first exemplary embodiment, a description has been given of a case where, when voxel data is converted into polygon mesh data, attributes are transferred to the polygon mesh data. In the present exemplary embodiment, a description will be given of a case where, when voxel data and polygon mesh data that are associated with each other are acquired, attributes are transferred to the polygon mesh data. The configuration of the three-dimensional-object forming system 1 (refer to FIG. 1), the configuration of the information processing apparatus 10 (refer to FIG. 2), the functional configuration of the information processing apparatus 10 (refer to FIG. 3), and the example illustrations of polygons (refer to FIGS. 4A and 4B) according to the present exemplary embodiment are the same as or similar to those in the first exemplary embodiment and will not be repeatedly described. Further, the example illustration of the shortest distance (refer to FIG. 5), the illustration depicting the three-dimensional body (refer to FIG. 6), the configuration of the three-dimensional-object forming apparatus 200 (refer to FIG. 7), the configuration of each type of information (refer to FIGS. 9A to 9D), and the example illustration of reducing the number of polygons (refer to FIGS. 10A and 10B) according to the present exemplary embodiment are the same as or similar to those in the first exemplary embodiment and will not be repeatedly described.

Figure 12:
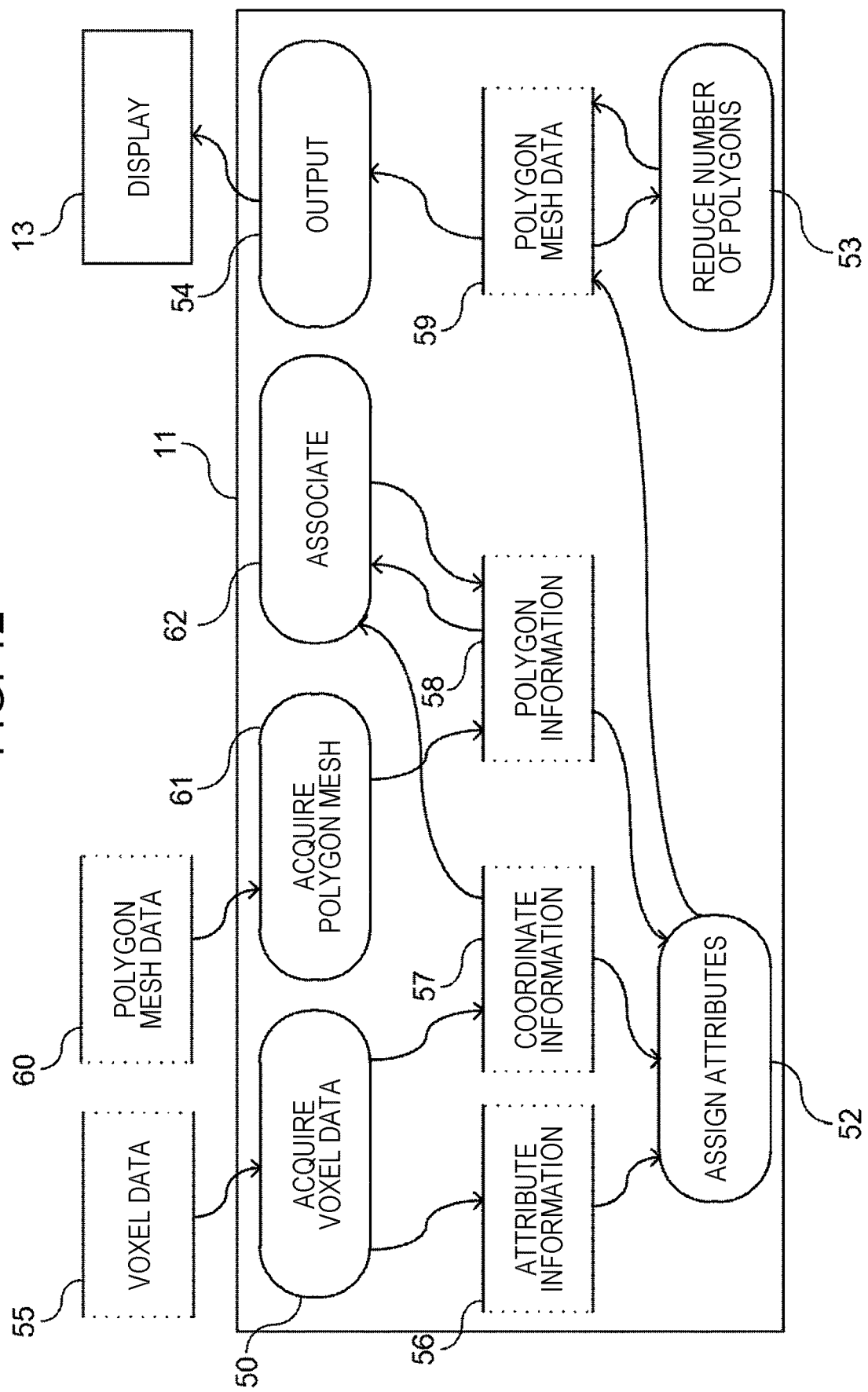
FIG. 12 is a data flow diagram depicting an example of information processing according to a second exemplary embodiment.

First, a method to assign an attribute to a polygon in the present exemplary embodiment will be described with reference to FIG. 12. FIG. 12 is a data flow diagram depicting an example of information processing according to the present exemplary embodiment. The same numerals are attached to information processing steps that are the same as the information processing steps depicted in FIG. 8, and descriptions regarding such steps will be omitted.

As depicted in FIG. 12, the CPU 11A of the information processing apparatus 10 performs the process of acquiring voxel data 50, the process of assigning attributes 52, the process of reducing the number of polygons 53, the output process 54, a process of acquiring polygon mesh data 61, and an association process 62.

In the process of acquiring polygon mesh data 61, the polygon information 58 is acquired from polygon mesh data 60, which is input by a user. The polygon information 58, which is acquired from the polygon mesh data 60, is not associated with voxels. In other words, voxel coordinates included in the coordinate information 57 need to be associated with polygons included in the polygon information 58.

In the association process 62, polygons and voxels are associated with each other by using the polygon information 58, which is acquired from the polygon mesh data 60, and the coordinate information 57. Specifically, voxel coordinates included in the coordinate information 57 and vertex coordinates included in the polygon information 58 are compared and associated with each other.

Figure 13:
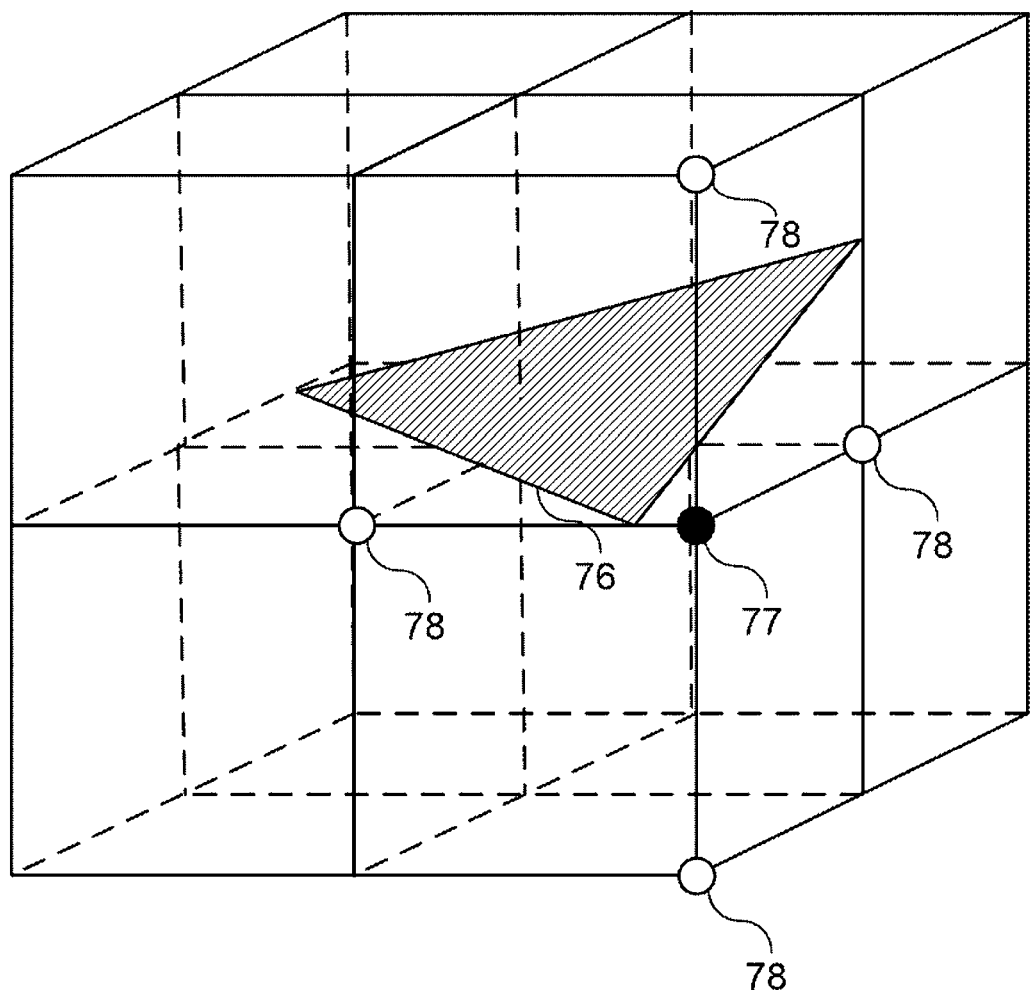
FIG. 13 is a schematic illustration depicting an example of a polygon used to describe determination of voxels to be associated with the polygon according to the second exemplary embodiment.

For example, as depicted in FIG. 13, if coordinates of a vertex of a polygon 76 included in the polygon information 58 are referenced, a voxel 77, which has the coordinates closest to the coordinates of the vertex, is obtained. A voxel 78, which is adjacent to the voxel 77, is identified as a candidate for a voxel to be associated with the polygon 76, and it is determined whether the distance from the voxel 78 to the polygon 76 is within a predetermined distance. If the distance from the voxel 78 to the polygon 76 is within the predetermined distance, the voxel 78 and the polygon 76 are associated with each other.

Each voxel adjacent to the voxel 78, which is associated with the polygon 76, is also identified as a candidate for a voxel to be associated with the polygon 76, and it is determined whether the distance from the identified voxel to the polygon 76 is within the predetermined distance. This procedure is repeated until all the candidates for a voxel to be associated are investigated. In this way, the voxel 77, which is associated with the polygon 76, and the voxel 78, which is a candidate for a voxel to be associated with the polygon 76, are identified, and polygons and voxels are associated with each other. The predetermined distance in the present exemplary embodiment is the radius of the circumcircle of a voxel. However, this is not meant to be limiting. The predetermined distance may be specified by the user.

However, if a polygon to be associated is large in size, candidate voxels are numerous. As a result, a huge amount of processing is required for determination processes, and association between polygons and voxels becomes difficult. Thus, when polygons and voxels are associated with each other, polygons need to be divided in advance before association.

Figure 14:
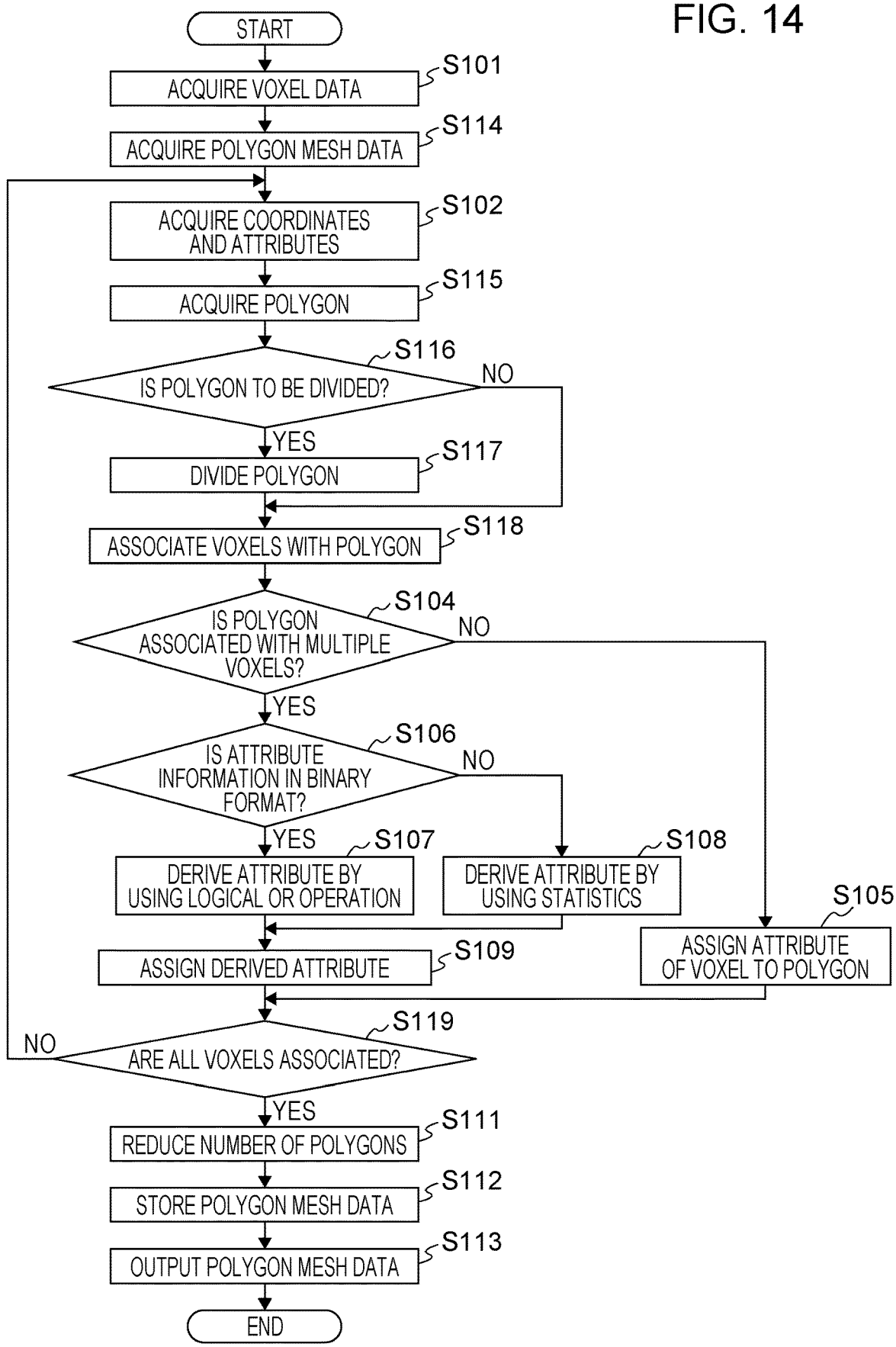
FIG. 14 is a flowchart depicting an example of information processing according to the second exemplary embodiment.

Next, referring to FIG. 14, an operation of an information processing program according to the present exemplary embodiment will be described. FIG. 14 is a flowchart depicting an example of information processing according to the present exemplary embodiment. The CPU 11A loads the information processing program from the ROM 11B or the nonvolatile memory 11D and executes the program, and the information processing depicted in FIG. 14 is performed. The information processing depicted in FIG. 14 is performed, for example, in response to an input from the user to execute the information processing program. The same symbols are attached to information processing steps that are the same as or similar to the information processing steps depicted in FIG. 11, and descriptions regarding such steps will be omitted.

In step S114, the CPU 11A acquires polygon mesh data.

In step S115, the CPU 11A acquires vertex coordinates of a polygon from the polygon mesh data.

In step S116, the CPU 11A determines whether the polygon is to be divided. If the polygon is to be divided (YES in step S116), the CPU 11A makes the process proceed to step S117. In contrast, if the polygon is not to be divided (NO in step S116), the CPU 11A makes the process proceed to step S118.

In step S117, the CPU 11A divides the polygon.

In step S118, the CPU 11A associates voxels with a polygon by using voxel coordinates and vertex coordinates.

In step S119, the CPU 11A determines whether all the voxels have been associated with polygons. If all the voxels have been associated with polygons (YES in step S119), the CPU 11A makes the process proceed to step S111. In contrast, if at least one voxel has not been associated with polygons (NO in step S119), the CPU 11A makes the process proceed to step S102.

As described above, in the present exemplary embodiment, attributes retained by voxels in voxel data are transferred to polygon mesh data.

In each exemplary embodiment, a description has been given of a case where attributes assigned to voxel data are transferred to attributes for polygon mesh data. However, this is not meant to be limiting. For example, if voxel data retaining no attribute is acquired, features of a three-dimensional body may be extracted from the voxel data and assigned as attributes, and the extracted attributes may be transferred to polygon mesh data. Further, if only polygon mesh data is acquired, the polygon mesh data may be converted into voxel data, features may be extracted from the voxel data and assigned as attributes, and the voxel data may be converted again into polygon mesh data to transfer the attributes.

The present disclosure has been described by using the exemplary embodiments as above, but the scope of the present disclosure is not limited to the range described in the above exemplary embodiments. Various modifications and improvements to the above exemplary embodiments are possible without departing from the spirit of the present disclosure, and embodiments incorporating such modifications or improvements are also within the technical scope of the present disclosure.

For example, in the present exemplary embodiments, a description has been given of a case where the information processing apparatus 10, which creates three-dimensional-shape data in which attributes are transferred to polygon mesh data, and the three-dimensional-object forming apparatus 200, which forms a three-dimensional body in accordance with the three-dimensional-shape data, are separately installed. However, this is not meant to be limiting. The three-dimensional-object forming apparatus 200 may have a function of the information processing apparatus 10.

In other words, the acquisition unit 205 of the three-dimensional-object forming apparatus 200 may acquire voxel data, and the controller 206 may perform the information processing in FIG. 11 or 14 and transfer attributes to polygon mesh data to create three-dimensional-shape data.

In the embodiments above, the term "processor" refers to hardware in a broad sense. Examples of the processor include and general processors (e.g., CPU: Central Processing Unit), dedicated processors (e.g., GPU: Graphics Processing Unit, ASIC: Application Specific Integrated Circuit, FPGA: Field Programmable Gate Array, and programmable logic device).

In the embodiments above, the term "processor" is broad enough to encompass one processor or plural processors in collaboration which are located physically apart from each other but may work cooperatively. The order of operations of the processor is not limited to one described in the embodiments above, and may be changed.

Further, in the above exemplary embodiments, a description has been given of a case where the information processing program, which transfers attributes to polygon mesh data, is stored in the repository 15, but the present disclosure is not limited to this example. The information processing program according to the present exemplary embodiments may be recorded in a computer-readable recording medium and provided. For example, the information processing program according to the present exemplary embodiments may be recorded on an optical disc, such as a compact disc ROM (CD-ROM) or a digital versatile disc ROM (DVD-ROM), and provided. The information processing program according to the present exemplary embodiments may be recorded in a semiconductor memory, such as a universal-serial-bus (USB) memory or a memory card, and provided. Further, the information processing program according to the present exemplary embodiments may be acquired from an external apparatus via a communication line connected to the communication unit 14.

The foregoing description of the exemplary embodiments of the present disclosure has been provided for the purposes of illustration and description. It is not intended to be exhaustive or to limit the disclosure to the precise forms disclosed. Obviously, many modifications and variations will be apparent to practitioners skilled in the art. The embodiments were chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

What is claimed is:

1. An information processing apparatus comprising:
a processor configured to
acquire voxel data and polygon mesh data, the voxel data representing a three-dimensional body by using a plurality of voxels, each of the plurality of voxels retaining an attribute, the polygon mesh data representing the three-dimensional body by using a plurality of polygons;
determine whether each polygon is associated with one voxel of the plurality of voxels or two or more voxels of the plurality of voxels;
upon determining that the polygon is associated with one voxel, assign an attribute of the one voxel to the polygon;
upon determining that the polygon is associated with two or more voxels, select a deriving method based on attributes retained by the two or more voxels, and perform the deriving method to derive, from of each of the two or more voxels, the attribute to be assigned to the polygon, and assign the derived attribute to the polygon; and
output the polygon mesh data after assigning attributes retained by the plurality of voxels to the plurality of polygons.

2. The information processing apparatus according to claim 1,
wherein the processor identifies one of the plurality of polygons for each of the plurality of voxels, the one of the plurality of polygons being associated with at least one of the plurality of voxels, and assigns an attribute retained by the at least one of the plurality of voxels to the one of the plurality of polygons.

3. The information processing apparatus according to claim 2,
wherein, if the at least one of the plurality of voxels associated with the one of the plurality of polygons includes two or more voxels, the processor derives an attribute by using at least one of a first type of data and a second type of data, the first type of data being attributes retained by the two or more voxels and the second type of data being a distance from the one of the plurality of polygons to each of the two or more voxels, and assigns the derived attribute to the one of the plurality of polygons.

4. The information processing apparatus according to claim 3,
wherein the processor assigns to the one of the plurality of polygons an attribute retained by one of the two or more voxels that is located at a distance that is shortest from the one of the plurality of polygons.

5. The information processing apparatus according to claim 4, wherein the distance is either a distance that is shortest from a reference point of one of the two or more voxels to a plane including the one of the plurality of polygons or a distance from the reference point to the center of gravity of the one of the plurality of polygons, the reference point being either the center of gravity of the one of the two or more voxels or a point that is specified by using coordinates and that is assigned in advance to each of the two or more voxels.

6. The information processing apparatus according to claim 5,
wherein the processor selects the deriving method from a logical OR operation, a logical AND operation, and statistics in accordance with the attributes retained by the two or more voxels and derives the attribute to be assigned to the one of the plurality of polygons.

7. The information processing apparatus according to claim 5,
wherein, if the one of the plurality of polygons is located at a distance equal to a predetermined threshold or less from one of the at least one of the plurality of voxels, the processor associates the one of the at least one of the plurality of voxels with the one of the plurality of polygons.

8. The information processing apparatus according to claim 4,
wherein the processor selects the deriving method from a logical OR operation, a logical AND operation, and statistics in accordance with the attributes retained by the two or more voxels and derives the attribute to be assigned to the one of the plurality of polygons.

9. The information processing apparatus according to claim 8,
wherein, if the one of the plurality of polygons is located at a distance equal to a predetermined threshold or less from one of the at least one of the plurality of voxels, the processor associates the one of the at least one of the plurality of voxels with the one of the plurality of polygons.

10. The information processing apparatus according to claim 4,
wherein, if the one of the plurality of polygons is located at a distance equal to a predetermined threshold or less from one of the at least one of the plurality of voxels, the processor associates the one of the at least one of the plurality of voxels with the one of the plurality of polygons.

11. The information processing apparatus according to claim 3,
wherein the distance is either a distance that is shortest from a reference point of one of the two or more voxels to a plane including the one of the plurality of polygons or a distance from the reference point to the center of gravity of the one of the plurality of polygons, the reference point being either the center of gravity of the one of the two or more voxels or a point that is specified by using coordinates and that is assigned in advance to each of the two or more voxels.

12. The information processing apparatus according to claim 11,
wherein the processor selects the deriving method from a logical OR operation, a logical AND operation, and statistics in accordance with the attributes retained by the two or more voxels and derives the attribute to be assigned to the one of the plurality of polygons.

13. The information processing apparatus according to claim 11,
wherein, if the one of the plurality of polygons is located at a distance equal to a predetermined threshold or less from one of the at least one of the plurality of voxels, the processor associates the one of the at least one of the plurality of voxels with the one of the plurality of polygons.

14. The information processing apparatus according to claim 3,
wherein the processor selects the deriving method from a logical OR operation, a logical AND operation, and statistics in accordance with the attributes retained by the two or more voxels and derives the attribute to be assigned to the one of the plurality of polygons.

15. The information processing apparatus according to claim 14,
wherein, if the one of the plurality of polygons is located at a distance equal to a predetermined threshold or less from one of the at least one of the plurality of voxels, the processor associates the one of the at least one of the plurality of voxels with the one of the plurality of polygons.

16. The information processing apparatus according to claim 3,
wherein, if the one of the plurality of polygons is located at a distance equal to a predetermined threshold or less from one of the at least one of the plurality of voxels, the processor associates the one of the at least one of the plurality of voxels with the one of the plurality of polygons.

17. The information processing apparatus according to claim 2,
wherein, if the one of the plurality of polygons is located at a distance equal to a predetermined threshold or less from one of the at least one of the plurality of voxels, the processor associates the one of the at least one of the plurality of voxels with the one of the plurality of polygons.

18. The information processing apparatus according to claim 17,
wherein, if the one of the plurality of polygons is located at a distance equal to a predetermined threshold or less from a voxel adjacent to the one of the at least one of the plurality of voxels associated with the one of the plurality of polygons, the processor associates the voxel adjacent to the one of the at least one of the plurality of voxels with the one of the plurality of polygons.

19. The information processing apparatus according to claim 1,
wherein, if an attribute assigned to one of the plurality of polygons is equivalent to or regarded as equivalent to an attribute assigned to a plurality of polygons adjacent to the one of the plurality of polygons, the processor converts the one of the plurality of polygons and the plurality of polygons adjacent to the one of the plurality of polygons into a reduced number of polygons to reduce polygons in number.

20. A non-transitory computer readable medium storing a program causing a computer to execute a process for information processing, the process comprising:
acquiring voxel data and polygon mesh data, the voxel data representing a three-dimensional body by using a plurality of voxels, each of the plurality of voxels retaining an attribute, the polygon mesh data representing the three-dimensional body by using a plurality of polygons;

determining whether each polygon is associated with one voxel of the plurality of voxels or two or more voxels of the plurality of voxels;

upon determining that the polygon is associated with one voxel, assigning an attribute of the one voxel to the polygon;

upon determining that the polygon is associated with two or more voxels, selecting a deriving method based on attributes retained by the two or more voxels, and performing the deriving method to derive, from of each of the two or more voxels, the attribute to be assigned to the polygon, and assign the derived attribute to the polygon; and outputting the polygon mesh data after assigning attributes retained by the plurality of voxels to the plurality of polygons.

* * * * *